United States Patent
Tadesse et al.

(10) Patent No.: US 11,588,911 B2
(45) Date of Patent: Feb. 21, 2023

(54) AUTOMATIC CONTEXT AWARE COMPOSING AND SYNCHRONIZING OF VIDEO AND AUDIO TRANSCRIPT

(71) Applicant: International Business Machines Corporation, Armonk, NY (US)

(72) Inventors: Girmaw Abebe Tadesse, Nairobi (KE); Celia Cintas, Nairobi (KE); Sarbajit K. Rakshit, Kolkata (IN); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 17/149,069

(22) Filed: Jan. 14, 2021

(65) Prior Publication Data
US 2022/0224763 A1 Jul. 14, 2022

(51) Int. Cl.
*H04L 67/50* (2022.01)
*G06F 16/435* (2019.01)
*G06N 3/08* (2006.01)
*G06N 3/04* (2006.01)
*G06F 40/40* (2020.01)

(52) U.S. Cl.
CPC .......... *H04L 67/535* (2022.05); *G06F 16/435* (2019.01); *G06N 3/0454* (2013.01); *G06N 3/08* (2013.01); *G06F 40/40* (2020.01)

(58) Field of Classification Search
CPC .......... H04L 67/22; G06F 16/435; G06N 3/08
See application file for complete search history.

(56) References Cited

U.S. PATENT DOCUMENTS

| | | | |
|---|---|---|---|
| 6,513,003 B1 | 1/2003 | Angell et al. | |
| 6,581,070 B1 | 6/2003 | Gibbon et al. | |
| 8,214,374 B1 | 7/2012 | Acharya | |
| 8,396,878 B2 | 3/2013 | Acharya | |
| 8,682,672 B1 | 3/2014 | Ha et al. | |
| 8,887,306 B1 | 11/2014 | Palacio | |
| 9,672,280 B2 | 6/2017 | Liu | |
| 10,170,153 B2 | 1/2019 | Ekambaram et al. | |
| 10,594,757 B1 * | 3/2020 | Shevchenko | H04L 51/046 |
| 10,607,611 B1 * | 3/2020 | Shellef | G10L 15/01 |
| 2007/0260457 A1 | 11/2007 | Bennett et al. | |

(Continued)

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

(Continued)

*Primary Examiner* — Minh Chau Nguyen
(74) *Attorney, Agent, or Firm* — Scully, Scott, Murphy & Presser, P.C.; Shimon Benjamin

(57) ABSTRACT

A search query can be received. User parameters can be identified based on the search query. The search query can be refined to include the user parameters. A search result from a search for media content using the refined search query can be received. Based on at least one search result received from the search and based on the user parameters, an augmented media content can be generated. Playing of the augmented media content can be synchronized with a user's activity by controlling playing of the augmented media content while detecting the user's activity pace.

20 Claims, 10 Drawing Sheets

(56) References Cited

U.S. PATENT DOCUMENTS

| | | | |
|---|---|---|---|
| 2012/0095834 A1* | 4/2012 | Doig | G06F 16/9535 |
| | | | 705/14.53 |
| 2013/0060784 A1 | 3/2013 | Acharya et al. | |
| 2015/0286718 A1 | 10/2015 | Wang et al. | |
| 2017/0353769 A1* | 12/2017 | Husain | H04N 21/25891 |
| 2019/0108686 A1* | 4/2019 | Spivack | G06Q 30/0277 |
| 2019/0340820 A1* | 11/2019 | Sivanadian | H04N 21/42204 |
| 2019/0392345 A1* | 12/2019 | Adaska | G06N 20/00 |
| 2020/0012892 A1* | 1/2020 | Goodsitt | G06N 5/04 |
| 2020/0057965 A1* | 2/2020 | Howard | G06N 3/08 |
| 2020/0092345 A1 | 3/2020 | Bostick et al. | |
| 2020/0272222 A1 | 8/2020 | Goela et al. | |
| 2020/0288204 A1 | 9/2020 | Duersch et al. | |
| 2021/0089531 A1* | 3/2021 | Hu | G06F 16/2425 |
| 2021/0319056 A1* | 10/2021 | Zhao | G06N 3/04 |

OTHER PUBLICATIONS

Canary, A., "How to Edit Videos Using Transcription (+ FREE Paper Edit Template)", Dec. 20, 2019, https://www.rev.com/blog/how-to-edit-videos-using-transcription. Accessed on Jan. 14, 2021, 11 pages.

Sonix, Inc., "Transcription for video producers", https://sonix.ai/video, Accessed on Jan. 14, 2021, 12 pages.

"Synchronizing a Voice Reply of a Voice Assistant With Activities of a User", U.S. Appl. No. 17/031,544, filed Sep. 24, 2020, 28 pages.

* cited by examiner

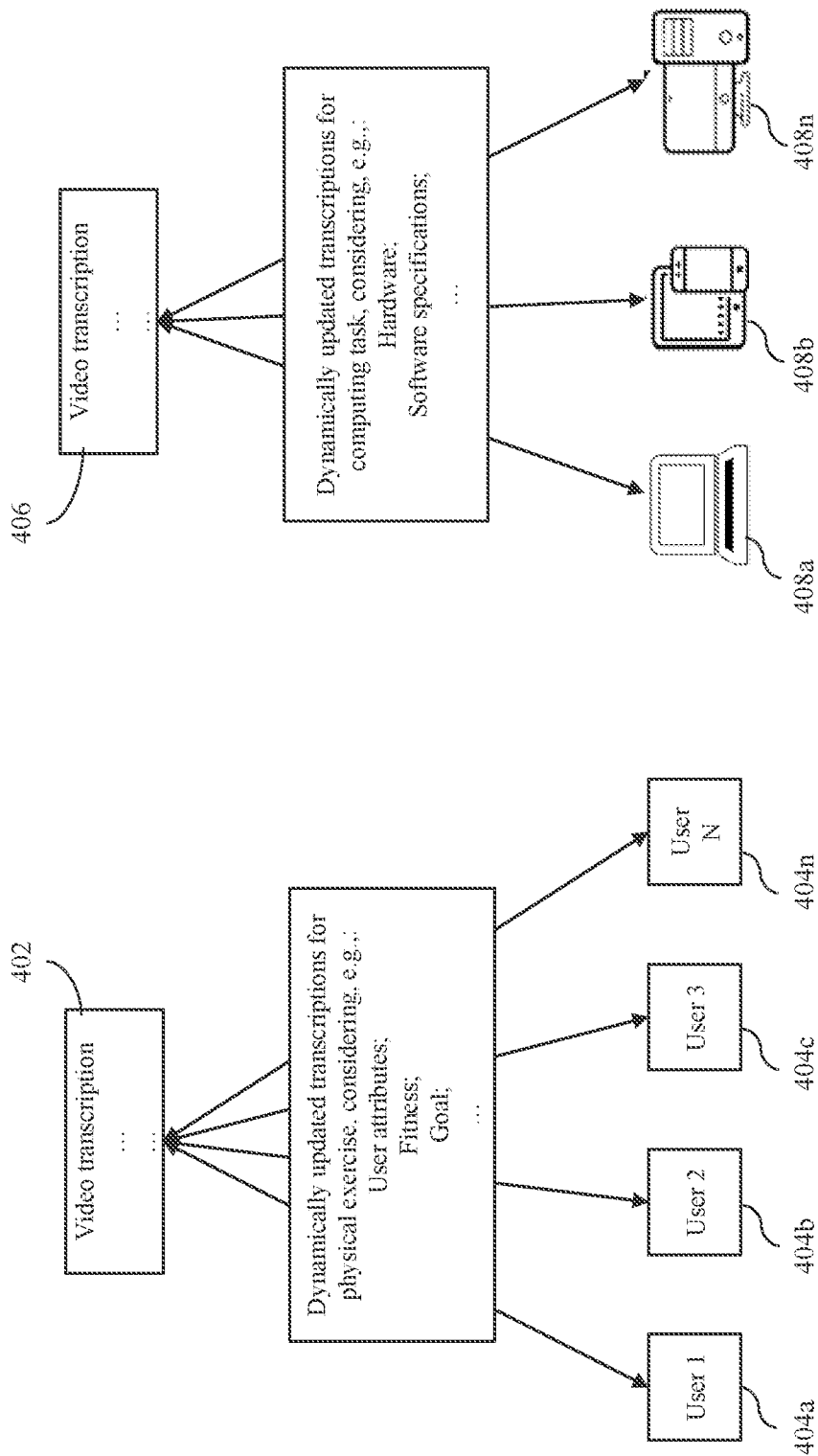

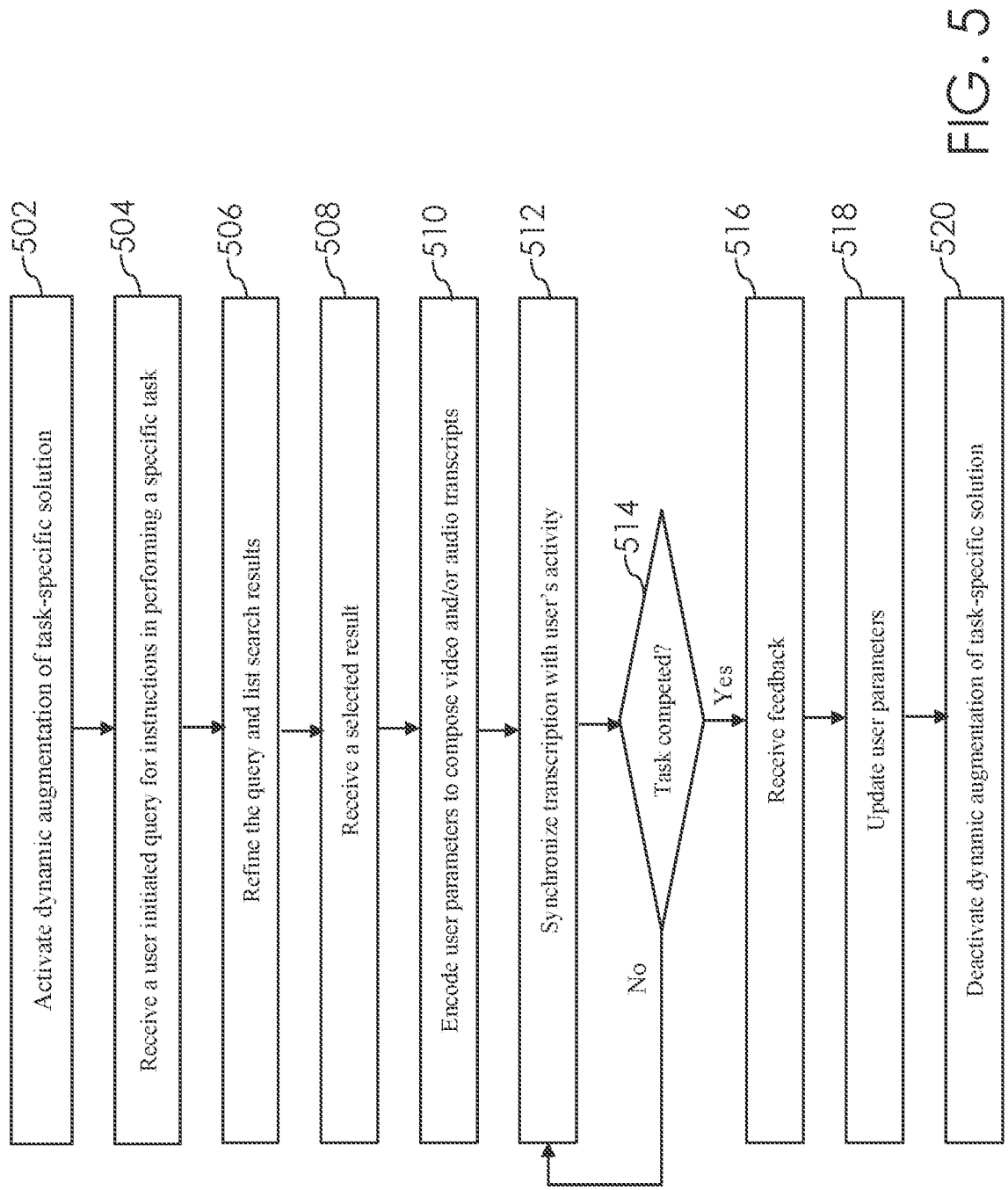

US 11,588,911 B2

AUTOMATIC CONTEXT AWARE COMPOSING AND SYNCHRONIZING OF VIDEO AND AUDIO TRANSCRIPT

BACKGROUND

The present application relates generally to computers and computer applications, and more particularly to machine learning and generating of multimedia content such as video and audio content.

Currently, the availability of information over a computer network such as the Internet, allows users to search for information such as online video or audio transcripts for steps or instructions in performing a task. For example, a user may refer to an instructional video while performing an activity in which the user may only have limited knowledge or experience and follow the steps shown in such a video. By way of example, a user may desire to make a face mask and initiate a query for searching for information related to such a task, for example, on an online platform or channel, which returns a list of search results. The user may select one among the top list of search results that is suitable for the user and decide to follow the instructions to make face masks in the user's environment, such as at user's home. While playing the video and following the instructions in performing the task, the user may stop or pause the video to perform the suggested set of steps. After the user finishes the first few steps, the user may resume the video to continue on the next set of steps. The process may continue until the user accomplishes the desired outcome.

BRIEF SUMMARY

The summary of the disclosure is given to aid understanding of a computer system and a method of generating context aware media content, for example, audio and/or video transcripts, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or its method of operation to achieve different effects.

A method, in one aspect, can include receiving a search query. The method can also include identifying user parameters based on the search query. The method can further include refining the search query to include the user parameters. The method can also include searching for a media content using the refined search query. The method can further include, based on at least one search result received from the step of searching and based on the user parameters, generating an augmented media content.

A system, in one aspect, can include a processor and a memory device coupled with the processor. The processor can be configured to receive a search query. The processor can also be configured to identify user parameters based on the search query. The processor can also be configured to refine the search query to include the user parameters. The processor can also be configured to search for a media content using the refined search query. The processor can also be configured to, based on at least one search result received from the search and based on the user parameters, generate an augmented media content. The processor can also be configured to synchronize playing of the augmented media content with a user's activity by controlling playing of the augmented media content while monitoring the user's activity pace.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 4A, 4B and 4C illustrate examples in embodiments of dynamically updated transcriptions.

FIG. 5 is another flow diagram illustrating a method in an embodiment.

DETAILED DESCRIPTION

In an aspect, existing known method of following instructions from an available instructional media, for example, video, resulting from a search, may be static, for instance, in that the video resumes from the point where the user paused the playing of the video. The current method also does not take into consideration the progress in activity or steps made by the user or group of users. For instance, even if the user has performed a few steps ahead, still the video resumes from where it was paused. If the user or group of users made errors or did not complete a step, the video instructions do not have a clue to such an event. The video also is not adapted to the user's particular context, for example, does not take into consideration whether the user has different parameters or device specifications (e.g., amount of ingredients) compared to the ones available in that specific video. The search algorithm predominantly depends on the query from the user, which may not encode more user contexts, and the user may need to manually select a result that suits the user's purpose.

A system and method are disclosed in one or more embodiment, which can identify, compose and synchronize media transcripts or content such as video and/or audio content. In one or more embodiments, the system and method may perform analysis of information such as user search query, comparative analysis of the volume of activity, the criticality of the activity, operational performance of the devices, and contextual situation, to identify, compose and synchronize media transcripts. In one or more embodiments, the system and/or method may implement custom trained generative adversarial networks (GANs) and use natural language processing (NLP) techniques in generating media content.

Figure 1:
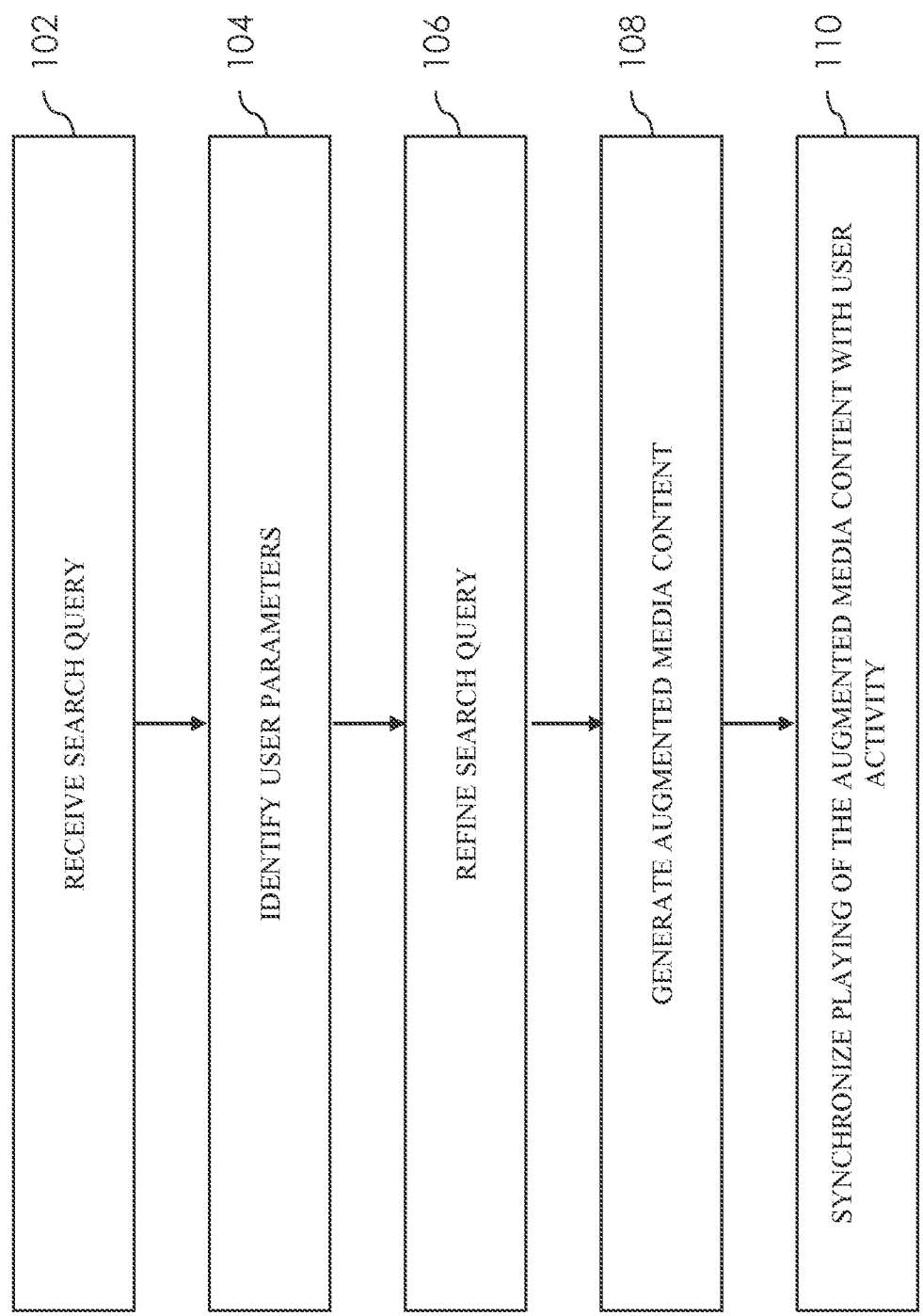
FIG. 1 is a flow diagram illustrating a method in an embodiment.

FIG. 1 is a flow diagram illustrating a method in an embodiment. The method can identify, compose and synchronize media transcripts or content. The method can be performed by or implemented on one or more computer processors, for example, including one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor or hardware processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

The method in one or more embodiments can receive a user written or spoken search query (e.g., for searching on on-line media or video platform such as YouTube™ from Google™, San Mateo, Calif. or another on-line media platform), identify customized parameters or user parameters based on the search query, generate or compose a video and/or audio transcript or content using the user or customized parameters, synchronize activities of the user (or a group of users) with the video and/or audio transcript, control the presented or displayed video and/or audio transcript navigation buttons (e.g., pause, play, forward, fast forward (fwd), rewind) according to synchronizing frequency or speed on a target user device.

At 102, a search query, for example, a user's search query is received. For example, one or more computer processors can receive a user's search query. For instance, a computer processor may intercept a search query entered on a browser web page or another user interface, for example, by a user searching media content. Media content can be instructional media content, which can aid or guide the user in performing an activity. For example, a user may be searching an instructional video content for guiding the user in performing a task or activity. In another aspect, the user's search query can be received via other ways, for example, via a plurality of input channels.

At 104, one or more user parameters or customized parameters can be identified based on the search query. For example, one or more processors can automatically identify past activities related to the search query from a plurality of data sources. Data sources can include data received from one or more Internet of Things (IoT) sources, for example, including contextual information such as location, weather, types of resources with their characteristics.

In an embodiment, one or more processors may identify user parameters from a plurality of data sources by employing machine learning algorithms. Examples of user parameters can include, but are not limited to: independent or joint time spent for each identified activity in the past, resources required for each identified activity, information on whether the required pre-activities are performed, comparative operational effectiveness of a device involved in the activity (e.g., heating efficiency of microwave oven is reduced by 20%, so more time to heat is required), comparative analysis of the volume or quantity of work (e.g., user has taken 900 g of food, whereas the video is based on 500 g of food), contextual situation in the surrounding (e.g., location, weather condition, and/or others), use of an alternative device (e.g., microwave oven versus (vs.) induction oven).

In another aspect, identifying user parameters may include obtaining manual input from the user or a group of users when there are no previous experiences. However, an automated user parameter encoding may be performed using one or more IoT devices, which may monitor a subject or group performing each step of a task or activity. Information as to whether the required pre-activities are performed may also be obtained by continuously monitoring the activity of the user. Upon a successful completion of a task by the user or group, the user-specific information (e.g., the amount of time elapsed for each step of the task, volume of work or activities) for that particular task can be updated and stored, e.g., for reference. The method of identifying user parameters can also include identifying historical preference of the user or a group of users, such as how the user performs the activity, user's likes and dislike (e.g., user likes overcooked, over boiled, gravy, without gravy).

At 106, using the user parameters, the search query can be refined. In an embodiment, a computer processor may refine the search query by using a query expansion method. For example, a seq2seq model can be implemented to learn a low dimensional embedding for each vocabulary entry and the method can apply a variant of K-nearest neighbor to obtain terms to a query. Seq2seq is a machine learning technique, in which a machine learning model is trained to output a sequence of words or items, given an input sequence of items. The seq2seq model that is trained can generate a new query from the original search query to guide and optimize the underlining search and retrieval engine (e.g., an on-line platform search engine such as the YouTube™ search engine). In an embodiment, the seq2seq model may be composed of encoder-decoder structure, each containing a recurrent neural network to generate a context-aware new query. Briefly, recurrent neural networks, or RNNs, are a class of neural networks that allow previous outputs to be used as inputs with hidden states. In an embodiment, an encoder recurrent neural network encodes the input sequence and the decoder recurrent neural network decodes the encoded input sequence of words into a target sequence of words, for example, for generating a refined search query. In an embodiment, the transformation can be further benefitted using advanced policy gradient method proximal policy optimization (PPO) that updates machine learning agent's generation policy, aiming to maximize the rewards based on answer coherency.

In an embodiment, given the refined query, a computer processor may identify a top-ranked search result. For example, a processor may perform a search using the refined query, which search returns one or more search results. The search results can be ranked, for example, by relevance to the search query, and a top search result can be selected or received for subsequent processing. In another embodiment, a user may be given an option to select a search result for subsequent processing. In another embodiment, the computer processor may automatically select a search result for subsequent processing.

Figure 2:
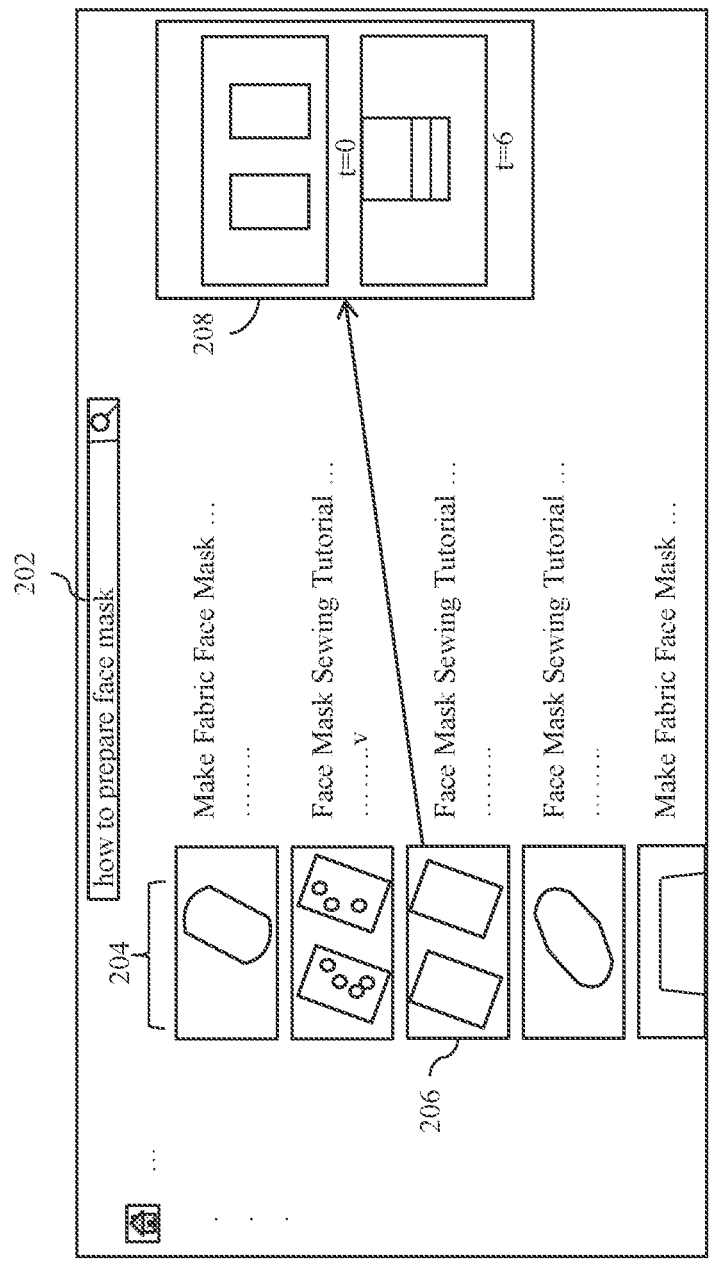
FIG. 2 illustrates an example screen capture diagram showing an example search result and a selected search result in an embodiment.

FIG. 2 illustrates an example screen capture diagram showing an example search result and a selected search result in an embodiment. A query 202 entered on a user interface such as a web browser can be captured and refined as described above. A search can be performed, which produces a set of search results 204. A result 206 can be selected from the set of search result that matches closely with the user parameters.

Referring back to FIG. 1, at 108, based on at least one search result received from the searching and based on the user parameters, a computer processor may generate augmented media content (e.g., 208 in FIG. 2). For example, augmentation of media content can use the user parameters and dynamics of user activity to generate augmented media content.

In one or more embodiments, the augmentation of the information in the selected search result can include composing video (e.g., using custom trained GANs) and audio transcript (e.g., using NLP).

Figure 3:
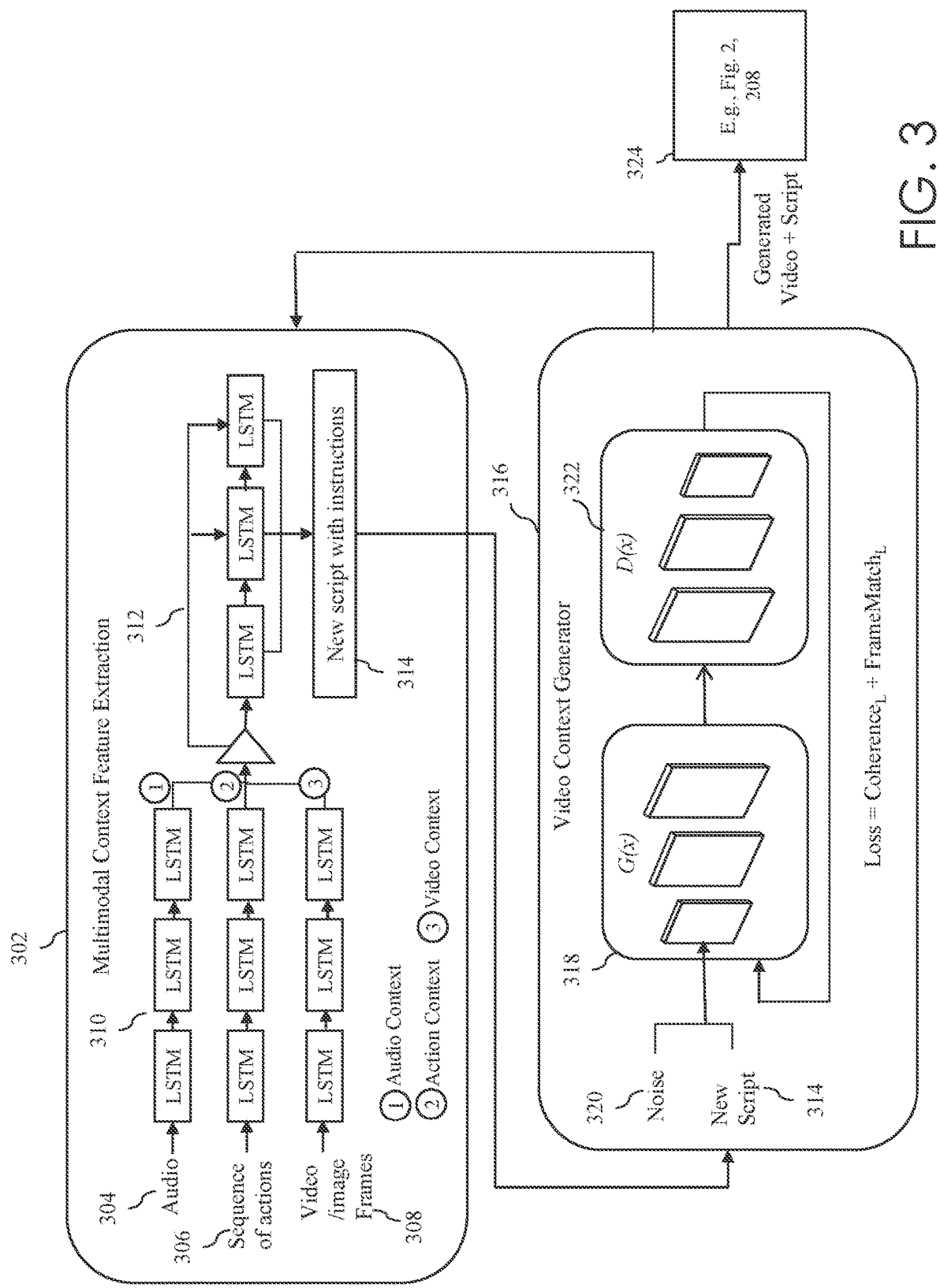
FIG. 3 shows components for generating augmented media content in an embodiment.

In one embodiment, there can be two components for generating the augmented media content, e.g., customized video and the transcript. FIG. 3 shows components for generating augmented media content in an embodiment. The components shown include computer-implemented components, for instance, implemented and/or run on one or more hardware processors, or coupled with one or more hardware processors. A module 302, also referred to as a first module or Multimodal Context Feature Extraction module processes audio 304, sequence of actions 306 and images 308 from one or more IoT devices installed in the user environment, e.g., in the house. Video frames 308 also include frames or images of the search result, e.g., also referred to as a reference video. This module may include Encoder-Decoder Long Short Term Memory (LSTM) architecture. Briefly, Long Short-Term Memory (LSTM) networks are a type of recurrent neural network. For each stream of data 304, 306, 308, the module creates a hidden representation from last state of recurrent neural networks (e.g. LSTMs) 310. The hidden representation, for example, audio context, action context and video context can form a fusion vector with information to create a new script 314 with an LSTM decoder 312. In an embodiment, the new script 314 includes audio and text. The new script 314 represents or identifies information such as user's current activity, user's needs, historical preference, which for example, can be collected from IoT devices, historical knowledge corpus, and/or another information source.

After the new transcript 314 is generated, it will be passed or fed to another module 316, also referred to as a second module or Video Context Generator module as input to generate the video attached to the new script, e.g., 324. In one example, a computer processor can implement this module with a modified Deep Convolutional Generative Adversarial Network (DCGAN). DCG includes two models, which are trained by an adversarial process. A generator learns to create output data that look real, while a distinguisher learns to distinguish real data apart from fake data. During training, the generator progressively becomes better at creating output data that look real, while the distinguisher becomes better at distinguishing them. The iterative process of training the generator and the distinguisher reaches equilibrium, e.g., when the distinguisher can no longer distinguish real data from fake data, e.g., at some loss convergence point. In an embodiment, the generator network G(x) 318 tries to synthesize the new videos with the concatenated input of the new transcript 318 given a particular context and random noise 320. The particular context, for example, is represented in the new script 314. For example, the context represented in the new script 314 has been extracted from the sequence of actions of the user 306, the reference video 308 and audio 304 in the process of generating the new script 314. For instance, the particular context can include the types of activity the user will be performing, initial IoT feed from the user, like as per example, ingredient selection by the user, and for example, the initial search query. The distinguisher network D(x) 322 includes two functions: first, a video distinguisher to classify real video from synthetic one, and second, coherence of the frame aligned with the correct new script, to search for semantically matched/mismatched one with the given script. In an embodiment, the loss function of the Video Context Generator module 316 is in charge of minimizing the distance of two different factors during training time: first, if the content is real or fake (this is done by comparing the ground-truth frame and the generated one), and second, create coherence content. In an embodiment, the coherence factor is considered optimal when the frame's content is highly correlated to the new script (the script can be represented with an embedding), for example, based on a predefined convergence threshold. In an embodiment, the distance between the expected embedding and the created one for a given frame is measured at each training step. The output of the Video Context Generator module 316 can be displayed in the video search engine 324 (e.g., on online platform such as YouTube™) so the user can follow the new instructions to finish the activity steps properly. In an embodiment, the distinguisher network D(x) 322 can be trained with real video samples and generated videos created by the G(x).

In an embodiment, the customized search replay, i.e., the identified and/or composed video/audio transcript can be played on the user channel (e.g., on online platform such as YouTube™) on a device. Referring back to FIG. 1, at 110, the method can include synchronizing playing of the augmented media content with a user's activity by controlling playing of the augmented media content while monitoring the user's activity pace. For example, in an embodiment, in providing the user with customized replay, a computer processor can also synchronize with the user or "group" of users' activities in providing the video/audio transcript. The computer processor may monitor the user's activity via synchronization above and validate the completeness of the activities performed by the user or group of users so far.

In an embodiment, the method may include predicting user's activities, for example, anticipating next actions, for example, by using one or more machine learning techniques, to help detect errors early. For example, a neural network trained based on historical data can be used to make such predictions. Other techniques can be used. In another embodiment, machine learning can also detect when a user performs an activity incorrectly or makes an error, and can automatically send information aiming to re-correct the error. By way of example, automated detection of incorrect activity can be performed using a machine learning algorithm (e.g., neural networks) to classify the activity being performed by the user. If the predicted activity is neither in the previous, current and future lists of sub-tasks, it is inferred as incorrect. For example, a duration threshold can be set to check the validity of the current activity being performed, and the detected activity can be labeled as in correct if it is not available the list of sub-tasks in the specified threshold.

In an embodiment, the method may include detecting that there is a delay between a user's activity and the transcript output. When a delay between a user's activity and the transcript output occurs, the computer processor can reinforce synchronization by identifying the point where new video/audio transcript plays or replays are needed, and then synchronizing the video play ore replay with the user or group of users' activities. By way of example, delay detection can be performed using the relative time difference between the current activity being performed and its corresponding label in the list of sub-tasks. For example, the list of sub-tasks for an activity can be generated with approximate time duration, and if the activity being performed is taking longer than the expected duration, it signals delaying. In an embodiment, a time threshold can be set a priori to determine delay.

In one embodiment, the method can include maintaining synchronization by a processor automatically controlling the video/audio transcript navigation buttons (pause, play, forward, fast forward (ffwd), rewind, etc.) according to the speed of the user performing the activities and dynamically synchronizing the voice replay with user's activities, for example, user's physical activities. For example, in an embodiment, automatic synchronizing can be done by continuously monitoring the user's or group of users' activities using IoT feeds and/or voice/speech interactions. For example, a processor may automatically search the current activity in its transcription and control the navigation buttons accordingly. For example, if the user lags in performing the user's current activity or is behind the video/audio content being played or shown, the processor may automatically activate a "rewind" function until the activity being performed by the user is detected in the video/audio content, and then replay the video/audio content. In another example, if a user expected to spend more time in a specific task, e.g., chopping onions, the system may pause it transcription playing.

Figure 4C:
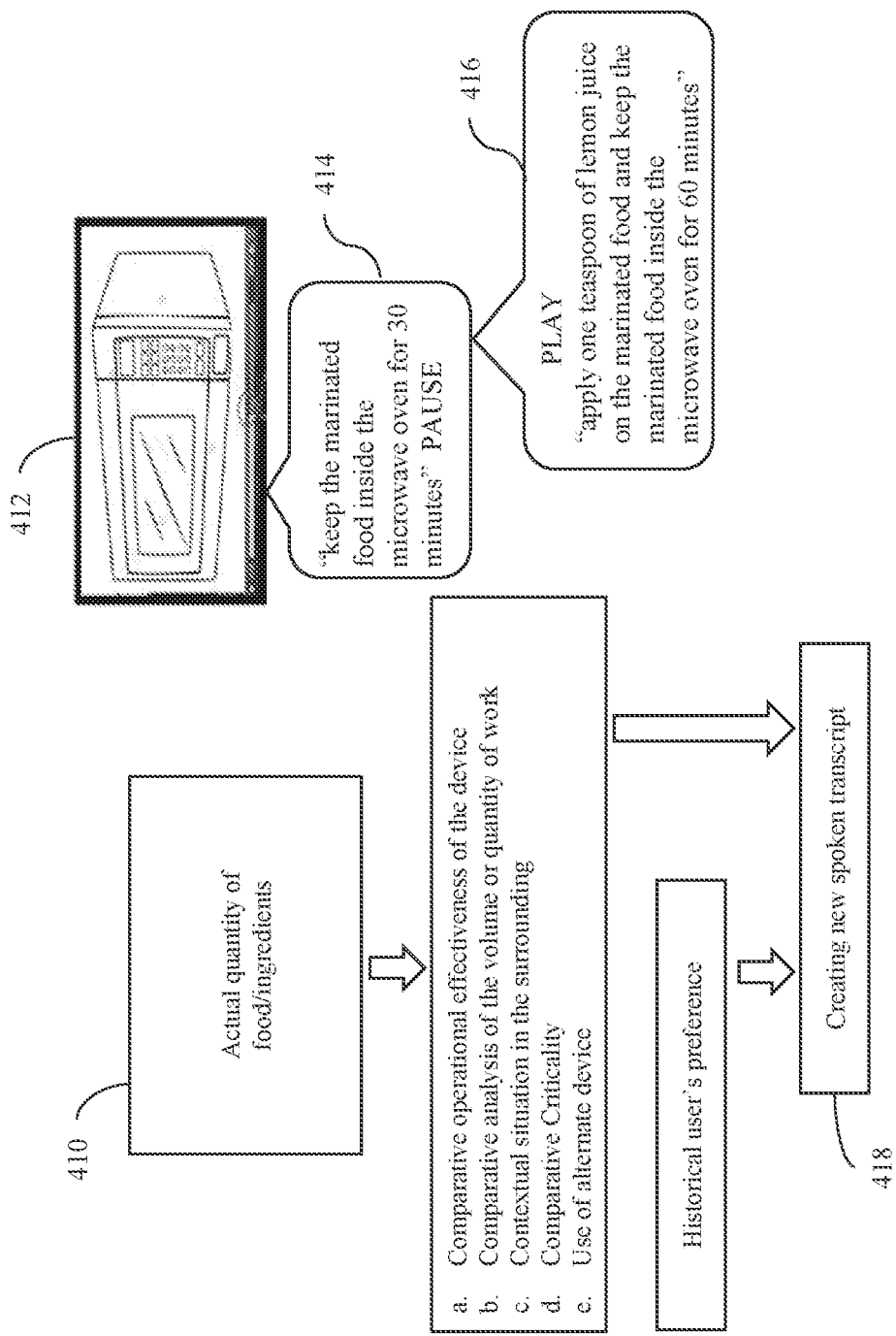

FIGS. 4A, 4B and 4C illustrate examples in embodiments of dynamically updated transcriptions. For example, the spoken transcript and video content may not be completely aligned with actual working context of the user, for instance, with respect to volume, user preference, device capability, and/or others. FIG. 4A shows an example use case in which a user is performing a physical exercise using video instructions. Examples of user parameters in this example can include, but not limited to, specific physical attributes associated with the user, the particular environment in which the user is performing the physical exercise, and specific fitness goals associated with the user. A new video transcription 402 can be generated using user specific parameters, for example, different for different users 404a, 404b, 404c 404n. FIG. 4B illustrates an example use case in which a user is performing a computer or computing task. Examples of user parameters in this example can include, but not limited to, the specific hardware and software specifications of the user's device. A new video transcription 406 can be generated using user specific parameters, for example, different for different user devices 408a, 408b, 484n. FIG. 4C illustrates an example where the activity being performed is cooking activity, for example, using a cooking instruction video/audio media. Examples of user parameters in this example can include, but not limited to, the user's available ingredients, volume of those ingredients, cooking equipment, and/or others. Based on the actual user parameters 410, a new transcript 418 can be generated and played on a user device, for example, shown at 412 as a user interface playing the new transcript. By way of example, an actual spoken transcript 414 of the video (reference video selected from the search) can be paused, and the new spoken transcript 418 can be played as shown at 416. In an embodiment a newly generated video, for example, generated based on the new spoken transcript 418, for example, as shown in FIG. 3, can be stored, for example, in a database or repository, and can be provided to another user based on that user's need.

When a referred video is being played to perform an activity, the method in an embodiment can gather information such as: Comparative operational effectiveness of the device (e.g., heating efficiency of microwave oven is reduced by 20%, therefore, more time then suggested in the instructions (e.g., in the reference video content) can be required). The effectiveness of the activity can depend on the effectiveness of the devices being used during activities; Comparative analysis of the volume or quantity of work (e.g., the user has taken 900 grams of food, whereas the instruction in the reference video content is based on 100 grams of food). The activity timing can depend on the volume of the activity; Contextual situation in the surrounding (e.g., location, weather condition). For example, cold weather may call for more heating and hence cooking time; Comparative criticality of the activity with the video content and actual activity; Use of alternate device (e.g., microwave oven vs. induction oven).

In an embodiment, by identifying how video and spoken transcript are to be updated dynamically based on the user's actual activity and reference video content, the method can provide appropriate guidance in achieving the desired outcome.

FIG. 5 is another flow diagram illustrating a method in an embodiment. One or more processors such as computer processors can implement and/or perform the method. At 502, a process of dynamic augmentation of media associated with performing a task can be activated. For example, a plug-in or a micro-service function can be implemented with a search engine platform, for activating and deactivating the process. A user interface such as a browser or a web browser can include a control or activation element or icon on the user interface. For instance, the process can be activated and/or deactivated based on a request from a user, and with a user's permission to identify any user parameters.

At 504, a user query or search query can be received. A processor, for example, can read or intercept the user query entered on a user interface. For example, the query can be entered via written text or spoken speech. At 506, the processor may refine the search query, for example, as described above. A search engine can be invoked to perform a search according to the refined search query. For instance, the search engine may search a database or a network of databases storing media content that satisfy the search query. In an embodiment, the processor may rank the search results and present a number of top-ranked results, and the user can be given an option to select a search result. In another embodiment, the processor may automatically select a top-ranked search result. At 508, a selected result is received.

At 510, the processor may encode user parameters to compose a new media content, for example, a video and/or audio content or transcript, for instance, as described above with reference to FIG. 1 and FIG. 3. At 512, the newly generated media content can be played along with the user performing the activity or task. At 514, the processor may determine whether the user has completed performing the activity or task. If so, the logic of the method flows to 516. At 516, the processor may provide an option to the user to provide a feedback and receive the feedback. At 518, user parameters identified for composing the new media content can be updated and stored. At 520, the processor may deactivate the process of dynamic augmentation. If at 514, the user has not completed the task, the process returns to synchronizing the user activity with the playing of the media content.

As described above, a method in an embodiment, can include receiving a user written or spoken search query, identifying user parameters based on the search query, generating or composing video and/or audio transcript using user parameters, synchronizing the user or a group of user's activities with the video/audio transcript. The method can also include controlling the displayed video/audio transcript navigation buttons (e.g., pause, play, forward, ffwd, rewind). Identifying user parameters can include one or more of: analyzing independent or joint time spent for each identified activity; identifying resources required or available for each identified activity; identifying information on whether the required pre-activities are performed; determining comparative operational effectiveness of resources for the activity (e.g., heating efficiency of microwave oven is reduced by 20% and therefore more time is required); comparative analysis of the volume or quantity of work.

In an embodiment, the user written or spoken search query can be refined using the identified user parameters and by employing a machine learning algorithm such as, but not limited to, reward-based seq2seq model.

Generating or composing video and/or audio transcript or content can include, but not limited to, training GANs to compose video content according to the refined search query and user parameters. One or more natural language processing (NLP) models can also be trained to generate audio transcript according to the refined search query and user parameters. In an embodiment, the video content and the audio transcript are aligned to synchronize with the activities of the user or group of users. In an embodiment, the video content can be augmented and/or aligned with the audio transcript, and the aligned video content and audio transcript can be synchronized with the activities of the user or group of users. For instance, the video and/or audio transcript can be dynamically compared with time of user activity, sequence of activity, and/or user performing steps of the activity.

In an embodiment, the video and/or audio transcript can be played on a user interface of a user device, which for example includes navigation buttons such as pause, play, forward, fast forward, rewind, and/or others, for controlling the playing the video and/or audio transcript. A processor may automatically control the displayed one or more navigation buttons to synchronize the playing speed of the video and/or audio transcript according to the frequency or speed of the user performing the activity in real time. In an aspect, the method may allow for adapting the content of the video and/or audio (e.g., images and/or audio) by taking into consideration the context of the user, e.g., user parameters.

In an embodiment, by monitoring user performing the activity in real time, for example, determining how much the user completed the steps for performing the activity, a processor may validate the progress of the activity performed so far, and may predict following one or more steps of the activity the user may perform. Validating in an embodiment can include determining any gap, missing or incomplete activities or steps, for example, by also considering the context of the user and users (e.g., location, availability of resources, and/or others). In another aspect, the method can include predicting the speed of the user performing the activity to dynamically synchronize the video/audio playing speed with the user's activity.

Figure 6:
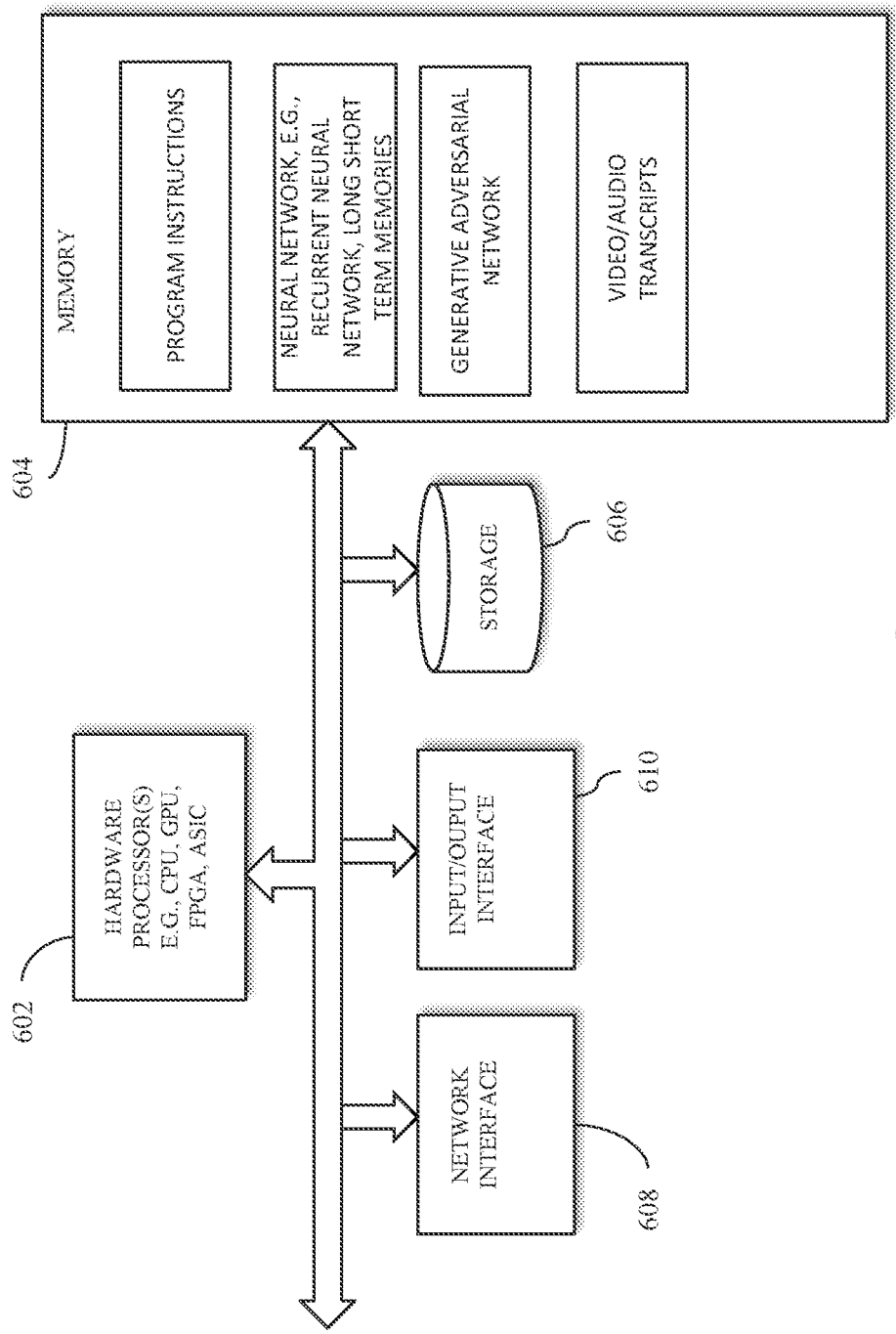
FIG. 6 is a diagram showing components of a system in one embodiment that can generate video and/or audio content to adapt to user parameters.

FIG. 6 is a diagram showing components of a system in one embodiment that can generate video and/or audio content to adapt to user parameters. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate video and/or audio content. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive a search query, identify user parameters based on the search query, generate or compose video and/or audio transcript using user parameters, synchronize the user or a group of user's activities with the video/audio transcript. In an embodiment, one or more hardware processors 602 may train neural networks, for example, generative adversarial networks (GANs) for generating video and/or audio content. In an embodiment, input data used to generate media content may be stored in a storage device 606 or received via a network interface 608 from a remote device, and may be temporarily loaded into a memory device 604 for building or generating the video and/or audio content. For example, training data to train neural networks may be stored in a storage device 606 or received via a network interface 608 from a remote device, and may be temporarily loaded into a memory device 604 for building a GAN model. Generated video and/or audio transcript may be stored on a memory device 604, for example, for playing by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
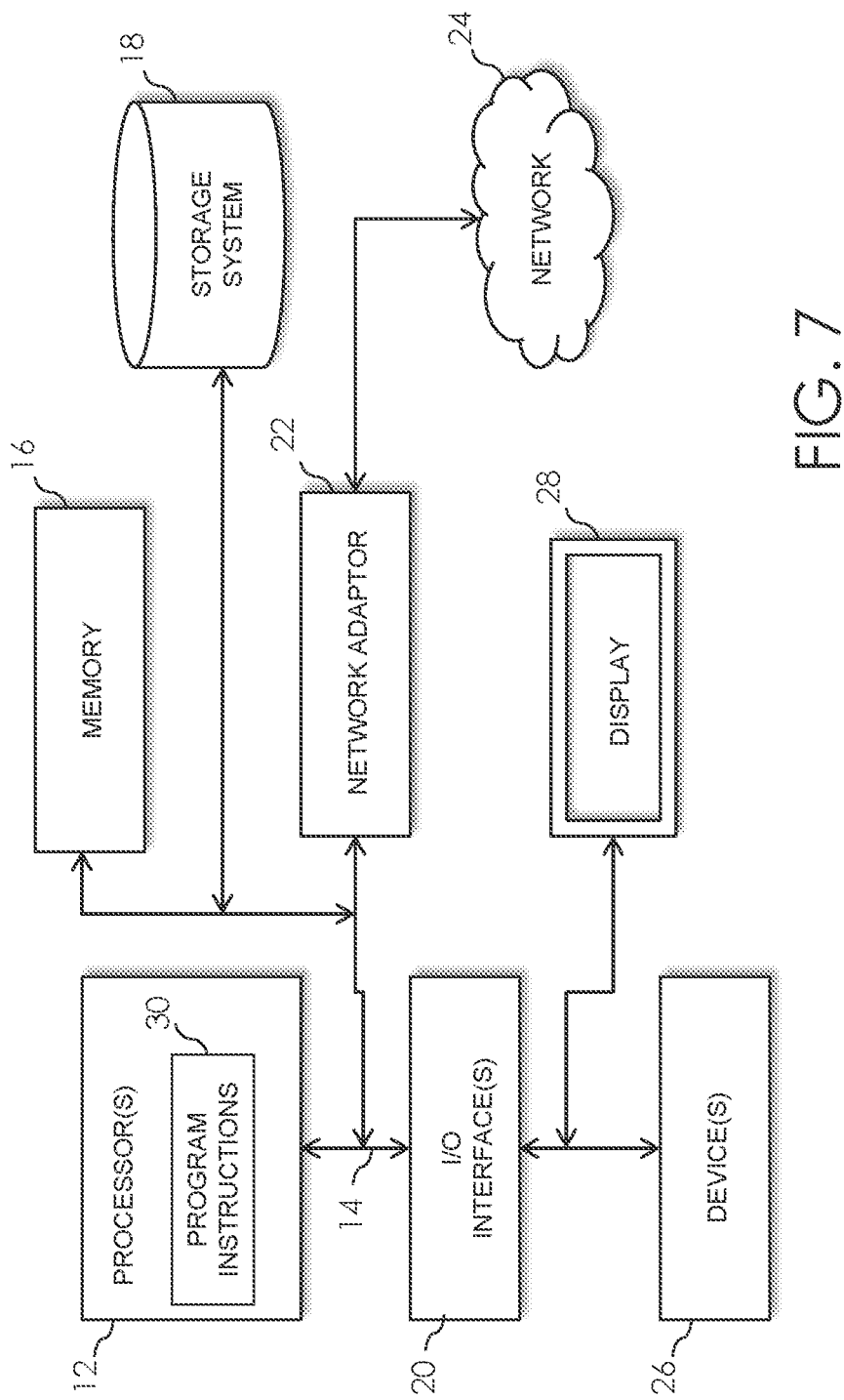
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
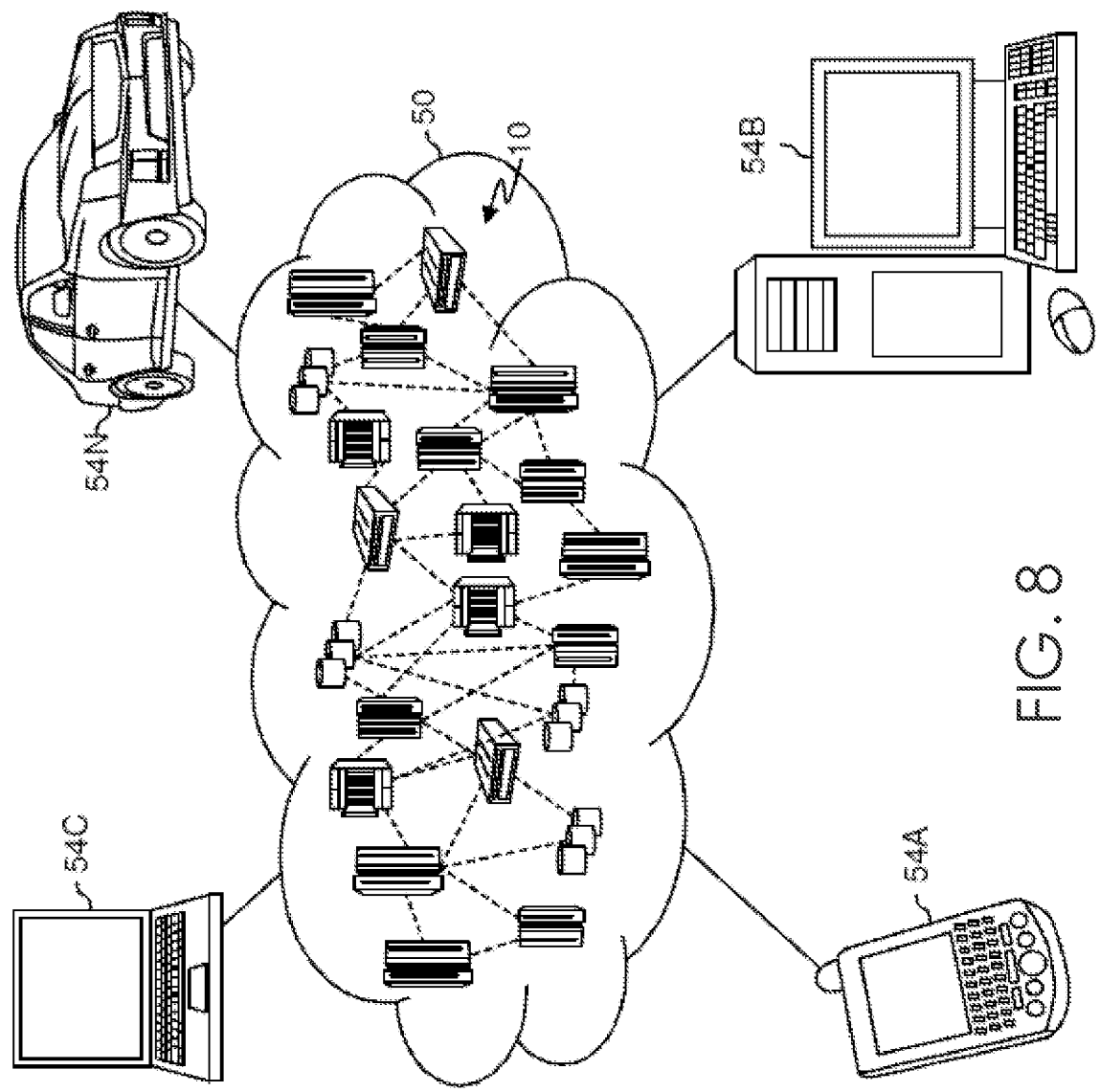
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
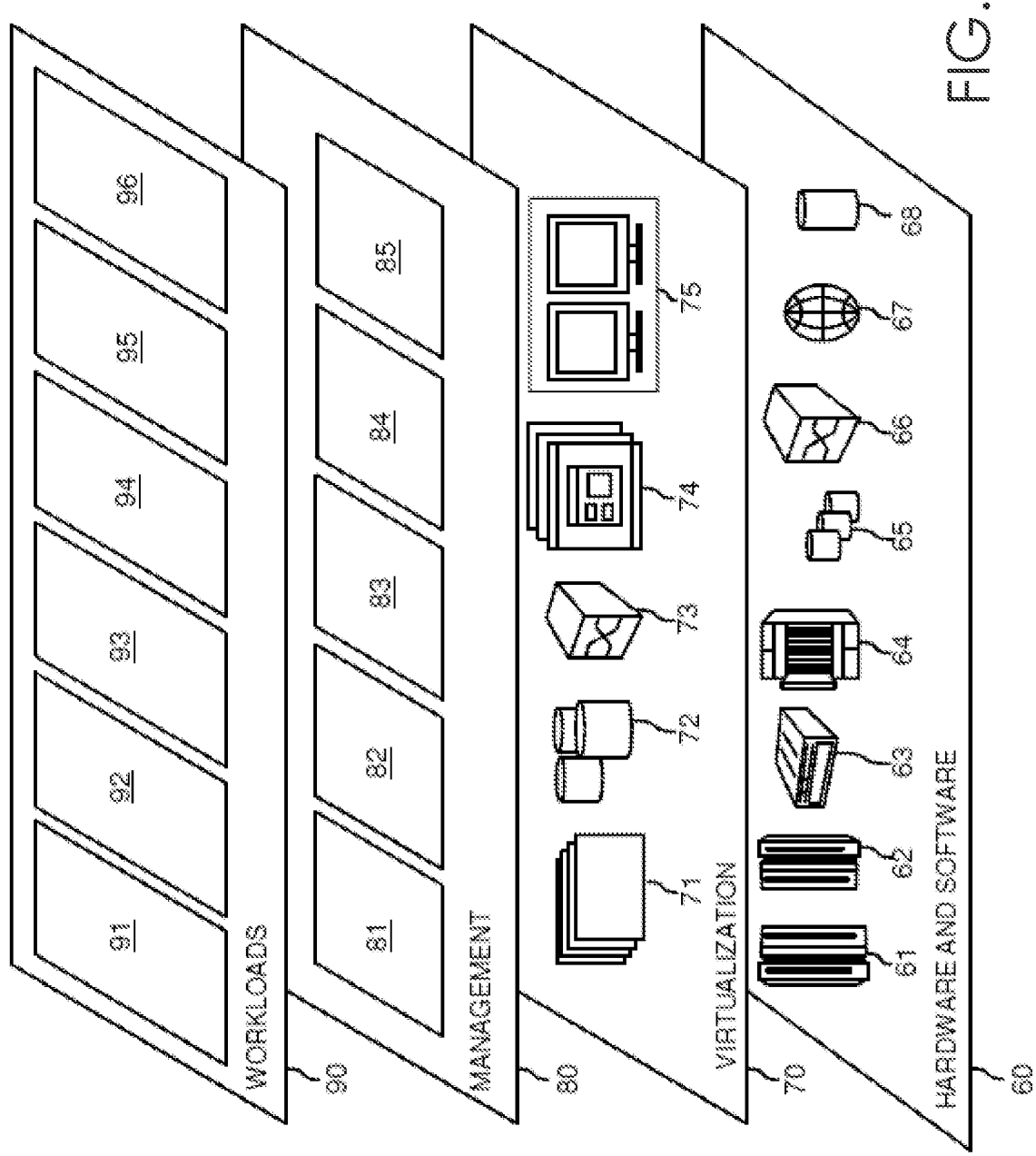
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media content generation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a search query;
identifying user parameters based on the search query;
refining the search query to include at least one of the user parameters;
using the refined search query, searching for content that provides how-to instructions for performing an activity specified in the search query; and
using at least one search result received from the step of searching and at least another one of the user parameters, generating an augmented media content including at least a customized video that provide instructions to the user for performing the activity specified in the search query, the customized video customized according to the at least another one of the user parameters.

2. The method of claim 1, wherein the step of generating includes training a generative adversarial network to generate a video content.

3. The method of claim 2, wherein the step of generating includes training a natural language processing model to generate audio content.

4. The method of claim 3, wherein the step of generating includes aligning the video content with the audio content.

5. The method of claim 1, further including synchronizing playing of the augmented media content with a user's activity by controlling playing of the augmented media content while monitoring the user's activity pace.

6. The method of claim 5, wherein the step of controlling playing of the augmented media content includes controlling navigation buttons presented with playing of the augmented media content.

7. The method of claim 1, wherein the media content includes audiovisual content.

8. The method of claim 1, wherein the step of refining the search query includes training a seq2seq model for generating the refined search query.

9. A system comprising:
a processor; and
a memory device coupled with the processor;
the processor configured to at least:
receive a search query;
identify user parameters based on the search query;
refine the search query to include at least one of the user parameters;
using the refined search query, search for content that provides how-to instructions for performing an activity specified in the search query;
using at least one search result received from the search and at least another of the user parameters, generate an augmented media content including at least a customized video that provide instructions to the user for performing the activity specified in the search query, the customized video customized according to the at least another one of the user parameters; and
synchronize playing of the augmented media content with a user's activity by controlling playing of the augmented media content while monitoring the user's activity pace.

10. The system of claim 9, wherein the processor is configured to train a generative adversarial network to generate a video content.

11. The system of claim 10, wherein the processor is configured to train a natural language processing model to generate audio content.

12. The system of claim 11, wherein the processor is configured to align the video content with the audio content.

13. The system of claim 9, wherein the content includes audiovisual content.

14. The system of claim 9, wherein the processor is configured to train a seq2seq model to generate the refined search query.

15. A computer program product comprising a computer readable storage medium having program instructions embodied therewith, the program instructions readable by a device to cause the device to:
receive a search query;
identify user parameters based on the search query;
refine the search query to include at least one of the user parameters;
using the refined search query, search for content that provides how-to instructions for performing an activity specified in the search query; and
using at least one search result received from the search and at least another one of the user parameters, generate an augmented media content including at least a customized video that provide instructions to the user for performing the activity specified in the search query, the customized video customized according to the at least another one of the user parameters.

16. The computer program product of claim 15, wherein the device is further caused to train a natural language processing model to generate audio content.

17. The computer program product of claim 16, wherein the device is further caused to align the video content with the audio content.

18. The computer program product of claim 15, wherein the device is further caused to synchronize playing of the augmented media content with a user's activity by controlling playing of the augmented media content while monitoring the user's activity pace.

19. The computer program product of claim 15, wherein the device is further caused to train a generative adversarial network to generate a video content.

20. The computer program product of claim 15, wherein the device is further caused to train a seq2seq model to generate the refined search query.

* * * * *